United States Patent

Imai et al.

[15] 3,661,594
[45] May 9, 1972

[54] PRODUCTION OF BACTERIAL RENNET FOR MAKING CHEESE

[72] Inventors: Tomio Imai, Tokyo; Yoshio Irie, Matsudo; Yoshinobu Kanazawa, Soka, all of Japan

[73] Assignee: Godo Shusei Kabushiki Kaisha, Tokyo, Japan

[22] Filed: Jan. 16, 1970

[21] Appl. No.: 3,490

Related U.S. Application Data

[63] Continuation-in-part of Ser. No. 724,455, Apr. 26, 1968, abandoned, which is a continuation-in-part of Ser. No. 618,391, Feb. 24, 1967, abandoned.

[30] Foreign Application Priority Data

Feb. 26, 1966 Japan....................................41/11338

[52] U.S. Cl. ..................................99/116, 195/62, 195/66 R
[51] Int. Cl. ........................................A23c 19/02, C07g 7/028
[58] Field of Search ..................99/115, 116, 59, 62; 195/66, 195/67, 68, 96

[56] References Cited

UNITED STATES PATENTS

| | | | |
|---|---|---|---|
| 2,695,261 | 11/1954 | Ainsworth et al. | 195/96 |
| 2,771,397 | 11/1956 | Benedict et al. | 195/96 |
| 2,821,501 | 1/1958 | Simpson | 195/66 X |
| 3,151,039 | 9/1964 | Atima et al. | 195/62 |
| 3,275,453 | 9/1966 | Sardinas | 99/116 |
| 3,134,723 | 5/1964 | Corman | 195/66 |

OTHER PUBLICATIONS

Kikuchi, et al., Chemical Abstracts Vol. 70 April 1969 (page 212).

*Primary Examiner*—Lionel M. Shapiro
*Assistant Examiner*—D. M. Naff
*Attorney*—Wenderoth, Lind & Ponack

[57] ABSTRACT

Milk coagulating enzyme preparation is provided herein by a process comprising culturing a strain of Bacillus polymyxa on a nutrient medium containing assimilable carbon source and inorganic salts. The enzyme "bacterial rennet" produced by the aforementioned process is also employed herein as a milk coagulating enzyme useful for making cheese.

7 Claims, 1 Drawing Figure

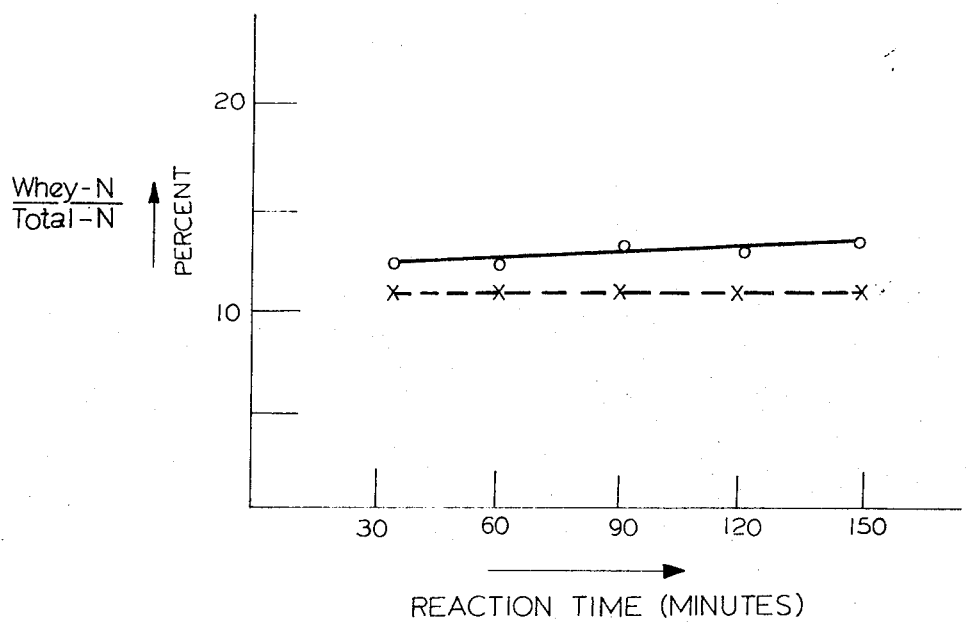
INVENTORS
TOMIO IMAI
YOSHIO IRIE
YOSHINOBU KANAZAWA
BY Wenderoth, Lind & Ponack
ATTORNEYS

PRODUCTION OF BACTERIAL RENNET FOR MAKING CHEESE

This application is a continuation-in-part of application Ser. No. 724,455, filed Apr. 26, 1968, which latter application is in turn a continuation-in-part of application Ser. No. 618,391, filed Feb. 24, 1967 both applications being now abandoned.

This invention relates to a new and improved milk coagulating enzyme produced by bacterial culturing. More particularly, it relates to a milk coagulating enzyme termed as "bacterial rennet" in the instant specification and claims, said "bacterial rennet" catalyzing the coagulation of casein in milk and is thus useful for manufacturing of cheese.

This invention also relates to a new method of making cheese using this "bacterial rennet."

Heretofore, as a milk coagulating enzyme, the "rennet," sometimes referred to as "rennin," has been well known. This commercially available rennet is obtained by extraction of the fourth stomachs of suckling calves and has the ability of altering casein from the colloidal into a coagulated or curdled state. However, inasmuch as the fourth stomach of a calf is necessary, there is a limit to the supply of the raw material, and therefore it is very costly.

On the other hand, certain proteolytic ensymes produced from plants or animal origins such as papain, ficin, pepsin, or trypsin etc., generally have milk coagulating activity to a certain degree.

Also the coagulating activity of the proteases produced by several strains of fungi, streptomyces, or other microbes has been recognized. In U. S. Pat. Nos. 2,151,039 and 3,212,905, there are disclosed a milk coagulating enzyme "microbial rennet" obtained from the cultures of fungi and also a method of making cheese using this "microbial rennet." It is, however, understood that the "microbial rennet" differs in its characteristics from the "bacterial rennet" termed in the present specification because the "bacterial rennet" is obtained from the cultures of the specified bacterium *Bacillus polymyxa* which differs from the fungi in the bacteriological classification. Many of these enzymes exhibit stronger protolytic activity than the milk coagulating activity, and as a result have the defects of forming too weak curds or developing some bitter tastes in the ripening of cheese. That is to say, they are not suitable for practical use as milk coagulating enzymes.

The milk coagulating enzyme prepared in accordance with this invention is referred to herein as "bacterial rennet." The material has remarkably high activity in milk coagulation while its proteolytic activity is very low. It also developes a good taste in the ripening of cheese.

The primary object of this invention is to provide a novel and inexpensive milk coagulating enzyme "bacterial rennet," having remarkably high coagulating activity by cultivating a strain of *Bacillus polymyxa* which novel strain is deposited in the Fermentation Research Institute Agency of Industrial Science and Technology, a public depository in 5-8-1,Inage Higashi, Shiba City, Shiba Prefecture, Japan, and this new strain of *Bacillus polymyxa* is designated as (FERM-P) No. 412. Hereinafter when the *Bacillus polymyxa* of the present invention is mentioned, it will refer to that strain designated (FERM-P) No. 412 mentioned above. Natural and artificially induced mutants thereof which possess most of the characteristic properties of the parent bacterium concerned can be employed.

It is another object of this invention to provide a method of producing the "bacterial rennet" by cultivation of the bacterium on a suitable artificial or natural nutrient medium.

A further object of this invention is to provide a method of separating the enzyme from the culture broth.

A still further object of this invention is to provide a method of making cheese by using this "bacterial rennet."

Other objects and advantages of this invention will become apparent from the following detailed description.

Milk coagulating enzyme having high activity is obtained from the cultivated broth of a selected strain of bacteria belonging to *Bacillus polymyxa* identified as (FERM-P) No. 412 cultivated on several kinds of artificial or natural nutrient media containing carbohydrates, nitrogen sources, growth factors and inorganic salts. As the carbon sources, assimilable carbohydrates such as the flours of corn, soybean or other crops, powdered skimmed milk and various sugars can be used. Similarly, as the nitrogen sources, a wide range of organic or inorganic compounds can be used. The inorganic salts may also include phosphate, magnesium, calcium and other salts.

The cultivation of the bacterial strain is carried out in a conventional manner in liquid broth at a temperature of 25°–37° C. and at a pH of 5–8 for 2–7 days. Thus, while in the case of liquid culture, surface culture may be employed, better results are obtained by means of shaking or submerged cultures.

As a result of the cultivation, the milk coagulating enzyme "bacterial rennet" is produced in the nutrient medium.

In order to separate the crude enzyme from the culture broth, a refining process such as filtration or centrifugation (removal of the bacterial cells and insoluble matters) followed by salting out or precipitation with organic solvents or concentration under reduced pressure is carried out. In the case of salting out with ammonium sulfate of 0.3–0.8 saturation, the milk coagulating activity can be almost quantitatively transferred to the precipitated fraction. Also, in the case of the precipitation by using organic solvents, the recovery of activities of 88 percent, 80 percent, 70 percent, or 75 percent were shown respectively by adding aqueous solutions of methanol 75 percent, ethanol 70 percent, acetone 60 percent or isopropanol 70 percent. In this manner the crude "bacterial rennet" is obtained.

In the separation process using organic solvents, calcium salts such as calcium acetate, calcium chloride, or the like, are added to cultured broth in an amount such that the final concentration reaches 0.01 to 0.1 mol and the supernatant liquid is seperated by centrifugation. Then the supernatant liquid is able to be fractionated very easily by following the treatment with above mentioned organic solvents. If desired, the supernatant liquid is mixed with aqueous ethanol having concentration of up to 40 percent. The resulting precipitate is removed and then to the remaining ethanol solution is added an additional amount of ethanol until the concentration of ethanol reaches 70 percent by volume of the solution. This produces a precipitate and then the precipitate is recovered. It is found that the resultant precipitate gives the bacteria-made rennet of high water solubility.

It was found that the precipitation of impurities occurs when calcium salt is added to the cultured broth in the amounts of 0.01 to 0.1 mol. The resultant precipitate contains the impurities and therefore the precipitate is discarded. It is, however, practical to use the calcium salt in an amount up to 0.1 mol for avoiding the excessive cost due to using a large excess of said calcium salt.

The crude product maintains a high milk coagulating activity at a pH of from 4 to 9 when it is stored at 5° C. for 7 days, or at 27° C. for 24 hours. However, it becomes unstable at pH value of less than 3 or more than 10.

Furthermore, it is observed that the crude enzyme exhibits a strong coagulating activity in acidic solution in the same manner as in the case of the commercial rennet. It decreases in activity in solution as the pH of the solution increases.

In order to better explain the merits of this invention, reference is made to the accompanying drawing.

In the drawing, the solid line shows the amounts of nitrogen (Kjeldahl-N) transferred to whey part after milk was coagulated by adding the enzyme (obtained from *Bacillus polymyxa*) of this invention. The dotted line gives those amounts transferred in the case of commercial rennet under the same conditions. From the drawing it is observed that the enzyme of this invention exhibits substantially the same efficiency as in the commercial rennet because of nitrogen being as low as about 14 percent of total amount of nitrogen was constantly transferred to the whey during the incubation periods of from 30 to 150 minutes. This shows that the enzyme of this invention can coagulate the majority of casein in milk without much proteolysis.

Thus, this enzyme is confirmed to have very high milk coagulating activity as compared with the commercial one and is, consequently, considered to be useful "bacterial rennet" in cheese manufacture.

In a process of any cheese making, it is necessary to produce a curd by adding to milk a coagulating enzyme. The rennet, as a milk coagulating enzyme, is considered to be indispensable for this process, because it is well known and powerful in activity. According to this invention, however, it is possible to produce cheese of excellent quality very readily on a commercial scale without the use of rennet.

For the purpose of a better understanding of the present invention, several examples are given below which examples are purely illustrative of the invention.

In the Examples, the *Bacillus polymyxa* designated No. 3-8 refers to the private identification number of the company in which applicants are employed, whereas the designation (FERM-P) No. 412 refers to the Fermentation Research Institute Agency of Industrial Science and Technology public depository number.

EXAMPLE 1

A nutrient medium containing 10 percent corn flour, 0.1 percent powdered yeast extract and 1/200 mol of $CaCl_2$ was inoculated with a strain of bacterium belonging to Bacillus polymyxa No. 3-8, also identified as (Ferm-P) No. 412, and after 4 days' shaking or submerged culture at 30° C., the milk coagulating activity of the bacterium reached its maximum. The cells were separated by filtration or centrifugation and an enzyme solution was obtained. The milk coagulating activity of this enzyme solution was 400 Soxhlet units/ml for a 10 percent solution of powdered skimmed milk containing 1/100 mol of $CaCl_2$. By salting out this enzyme solution with ammonium sulfate of 0.3-0.8 saturation, substantially all of its activity could be transferred to the precipitated fraction. Furthermore, the activity of enzyme recovered is on the order of 88 percent, 80 percent, 70 percent or 75 percent, respectively by adding organic solvent of the following concentration: Namely methanol 75 %m ethanol 70 percent, acetone 60 percent and isopropanol 70 percent. Thus the crude enzyme can be obtained. For instance, the activity of the crude enzyme precipitated by the methanol 70 percent was 20 Soxhlet units/mg, while that of the commercial rennet powder of Chr. Hansen's Laboratory, Inc., was 100 Soxhlet units/mg.

Then "bacterial rennet" of this invention was used and cheese was made. Namely, to 100 kg of raw whole milk maintained at 30° C., was added 0.1 kg of $CaCl_2 \cdot 2H_2O$ followed by 1 kg of starter. When the acidity of the milk reached 0.18% (as lactic acid), 8 g of bacterial rennet obtained as described above was added, and the mixture was stirred. After 25 minutes' standing, the curd with elasticity was formed and cutting thereof was performed. Cooling was carried out in two consecutive steps at 34° and 38° C., and after 80 minutes of cooking at 38° C., casting into molds was performed with compression. The draining of the whey from the curd was almostly same as a case of commercial rennet, and then 8.6 kg of green cheese was obtained in the yield of 8.6 percent. This green cheese was salted by soaking in a sodium chloride solution. Test of taste and flavor after 4 months' ripening showed no sign of bitterness and no difference between this cheese and commercial rennet cheese.

EXAMPLE 2

A nutrient medium containing 7.5 percent of powdered skimmed milk, 1 percent of glucose, 0.1 percent of powdered yeast extract and 1/200 mol of $CaCl_2$ was inoculated with a strain of bacterium belonging to *Bacillus polymyxa* No. 3-8, also designated (FERM-P) No. 412, and after 4 days' shaking or submerged culture at 30° C., the cells were separated by filtration or centrifugation and an enzyme solution was obtained. The activity of this enzyme solution was 420 Soxhlet units/ml. Thus 1 ml of this enzyme solution was equivalent to 4.2 mg of rennet powder of Chr. Hansen Laboratory, Inc. By means of the method as described in Example 1, the enzyme was precipitated and then it was dried and powdered.

Next, to 80 kg of whole milk mixed with 20 kg of skimmed milk which were maintained at 30° C. were added to 0.12 kg of $CaCl_2 \cdot 2H_2$ O followed by 1.2 kg of starter. After a quarter hour 5 g of "bacterial rennet" obtained as mentioned above was added, and the same operations as in Example 1 were performed whereby was obtained 8.8 kg of green cheese (yield 11.0 percent).

EXAMPLE 3

A medium containing 3 percent of soybean flour, 1 percent of glucose, 0.1 percent of powdered yeast extract and 1/200 mol of $CaCl_2 \cdot 2H_2O$ was inoculated with a strain of bacterium belonging to *Bacillus polymyxa* No. 3-8, also designated (FERM-P) No. 412 and after 4 days' shaking or submerged culture at 30° C., the cells were separated by filtration or centrofugation, and an enzyme solution was obtained. The activity of this solution was 600 Soxhlet units/ml. By means of the method described in Example 1, the enzyme was precipitated, dried, and powdered. Using this enzyme preparation and carrying out the same process as in Example 1, cheese was obtained.

EXAMPLE 4

A medium containing 2 percent of glucose, 0.5 percent of ammonium sulfate, 0.05 percent of powdered yeast extract, 0.5 percent of $K_2HPO_4$, 0.01 percent of $MgSO_4 \cdot 7H_2O$, and 2 percent of $CaCO_3$ was inoculated with a strain of bacterium belonging to *Bacillus polymyxa* No. 3-8, also designated (FERM-P) No. 412, and after 4 days' shaking or submerged culture at 30° C., the cells were separated by filtration or centrifugation. The enzyme solution obtained showed an activity of 260 Soxhlet units/ml. This solution was treated as Example 1, whereby powdered "bacterial rennet" was obtained. This enzyme was used, and by processing as in Example 1 cheese was obtained.

What is claimed is:

1. A method for producing a novel milk coagulating enzyme which comprises culturing a bacterial strain of *Bacillus polymyxa* designated (FERM-P) No. 412 on a nutrient medium containing assimilable carbon and nitrogen sources and inorganic salts and recovering the coagulating enzyme from solution.

2. A method as in claim 1 wherein the culturing is conducted at a temperature of 25° to 37° C. and at a pH of 5 to 8.

3. A method as in claim 1 wherein the culture is conducted under aeration and agitation.

4. The milk coagulating enzyme prepared in accordance with claim 1.

5. A method of making cheese which comprises cultivating a bacterial strain of *Bacillus polymyxa* (FERM-P) No. 412 on a suitable nutrient medium, recovering a milk coagulating enzyme from said medium, incorporating said enzyme in the material milk, and effecting the coagulation of said mixture.

6. A method as in claim 5, wherein the cultivating is conducted at a temperature of 25° to 37° C. and at a pH of 5 to 8.

7. A method as in claim 5 wherein the culture is conducted under aeration and agitation.

* * * * *